Feb. 21, 1950          R. E. GUNTHER          2,498,415
ROTATING CUTTING DISK TYPE LAWN MOWER
Filed April 16, 1947          2 Sheets-Sheet 1
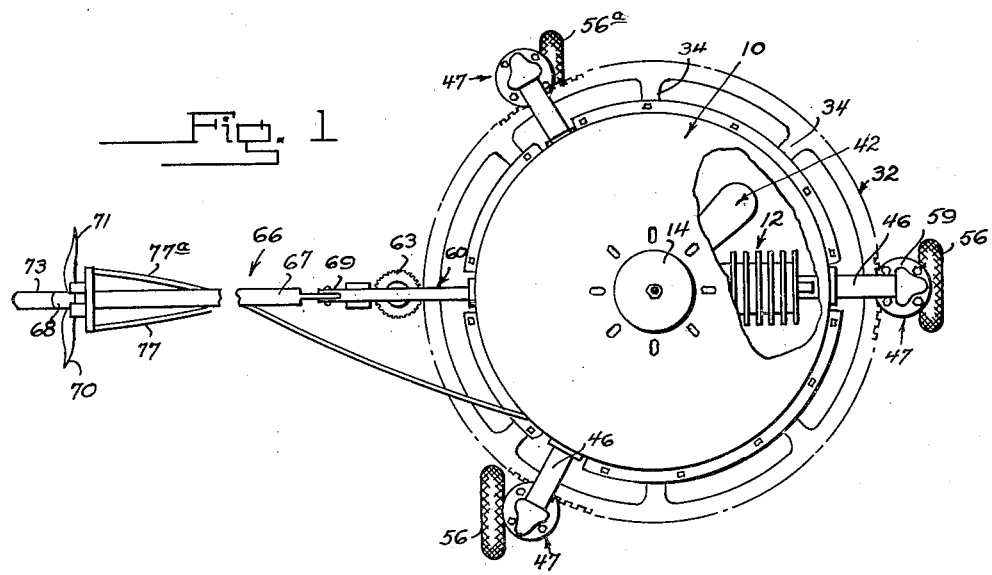
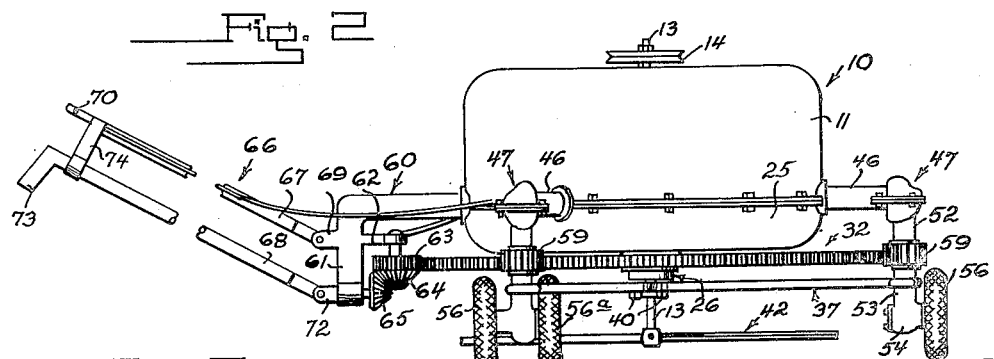
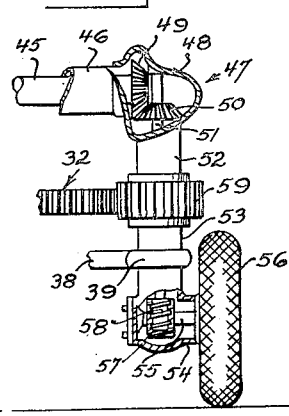
INVENTOR.
Roland E. Gunther
BY Lancaster, Allwine Rommel
ATTORNEYS.

Feb. 21, 1950   R. E. GUNTHER   2,498,415
ROTATING CUTTING DISK TYPE LAWN MOWER
Filed April 16, 1947   2 Sheets-Sheet 2
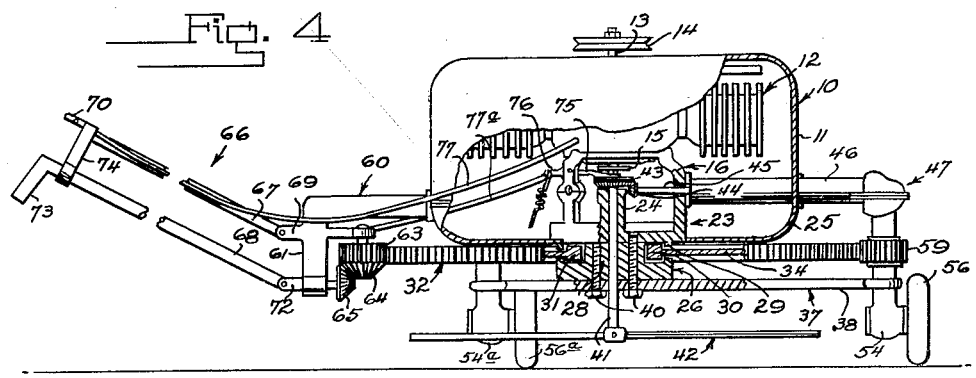
INVENTOR.
Roland E. Gunther
BY Lancaster, Allwine and Rommel
ATTORNEYS.

Patented Feb. 21, 1950

2,498,415

UNITED STATES PATENT OFFICE 2,498,415

ROTATING CUTTING DISK TYPE LAWN MOWER

Roland E. Gunther, Oceanside, N. Y.

Application April 16, 1947, Serial No. 741,794

3 Claims. (Cl. 56—25.4)

This invention relates to improvements in powered mowers for cutting grass, weeds, and the like, of the type wherein both the cutting means and one or more ground engaging wheels are motor driven, whereby operation of the cutting means and travel of the mower over the ground take place without effort on the part of the operator but under the operator's control; and a primary object of this invention is to provide an improved mower of this type so constructed and arranged that the mower can be caused to travel in arcs of selected lengths, with the operator remaining in a stationary position at the axis of each arc, and being required to move from his position a very short distance to assume proper position for the cutting of the next swath, instead of being required to follow the mower for the full distance of its various movements over the ground in cutting operations, as is the case with mowers generally.

Another important object of this invention is to provide a mower of the character indicated above so constructed and arranged that the operator can steer the mower so as to cause it to travel in any desired direction, in either curved paths or straight paths or paths involving straight and curved portions, while permitting the operator to retain control and direction of the mower while moving much smaller distances over the ground than are traversed by the mower.

A further important object of the invention is to provide a mower of the character indicated above so constructed and arranged that the mower can be operated to traverse paths over the ground at relatively great speed while permitting the operator thereof to maintain control and direction thereof while moving over the ground at substantially less speed.

Other important objects and advantageous features of this invention will be apparent from the following description and accompanying drawings, wherein merely for illustrative purposes, a presently preferred embodiment is set forth in detail.

In the drawings:

Figure 1 is a top plan view of said embodiment with a portion of the casing broken away, and showing the ground engaging dirigible wheels positioned to cause the mower to travel in a direction substantially perpendicular to the mower handle.

Figure 2 is a side elevation.

Figure 3 is an enlarged fragmentary elevation of one of the dirigible wheels and the mounting thereof, with portions broken away to reveal internal mechanism.

Figure 4 is a view similar to Figure 2 but partly in vertical longitudinal central section to reveal details of construction.

Figure 5 is a side elevation, partly in section, of the upper support spider.

Figure 6 is a perspective view of the lower support spider.

Figure 7 is a side elevation, partly in section, of the steering and control rod mounting bracket.

Figure 8 is a plan view of the lower wheel support.

Referring in detail to the drawings, the herein illustrated mower embodiment comprises a flat generally cylindrical horizontally divided casing or housing 10 in the upper part 11 of which is mounted a motor 12, such as a gasoline engine including a fuel supply (not shown), having a perpendicular motor shaft 13 having a starting pulley 14 above the casing and a clutch driving disk 15 on its lower end below the motor 12, as shown in Figure 4.

A supporting cage comprises an upper support spider 16 and a lower support spider 23. The upper spider 16 is secured to depend from the central part of the motor 12 concentrically around the lower end of shaft 13 and the driving clutch disk 15 and comprises, as shown in Figure 5, an annulus 17 from which depend circumferentially spaced outset legs 18 terminating at their lower ends in upper half bearings 19 for the wheel driving shafts described herein below.

The upper half bearings 19 are bolted to similar hub inverted lower half bearings 20 which are on the upper ends of circumferentially spaced legs 21 rising from a circular plate 22, forming the lower support spider 23, with a tubular standard 24 rising from the center of the plate 22.

The lower part 25 of the casing 10 is secured around the periphery of the plate 22 and the lower part of the lower spider support 23 projects downwardly through an opening formed in the bottom of the casing and rests upon the ring gear and lower support mount 26.

The mount 26 comprises a heavy circular plate 27 having a wide central cylindrical boss 28 to engage the underside of the lower support spider 23. An annular rib 29 on the underside of the lower support spider faces an annular rib 30 on the upper side of the plate 27 of the mount 26 so as to confine for rotation relative to the casing 10 about the boss 28 the heavy annular hub 31 of the horizontally disposed ring gear 32, whose toothed rim 33 is connected to the hub 31 by relatively thin spokes 34 which extends through the slot formed by the facing annular ribs 29 and 30.

Secured to the underside of the mount 26 is the plate-like hub 35 of the lower wheel support 37, from which hub extend radial arms 38 of equal length, corresponding in number to the number of steerable driven ground engaging wheels employed, in the present example, three.

Circumferentially spaced studs 40 pass upwardly through holes provided in the lower wheel support hub 36 and holes provided in the boss 28 of the mount 26, and thread into the plate 22 of the lower support spider 23, thereby securely but separably assembling these parts in their proper fixed concentric relation. The eyes 39 at the outer ends of the arms 38 and 38ª of lower wheel support spider 37 are fixedly connected to the wheel supports, described herein below, whereby the above described structure is supported by the wheels for movement over the ground.

The perpendicular cutter shaft 41 depends through the tubular standard 24 of the lower support spider 23 and through bores formed in the hubs of the mount 26 and lower wheel support 37 and has secured to its lower end at the proper elevation above the ground the fan-bladed cutter rotor 42, this rotor preferably being of the maximum diameter consistent with proper clearance with the ground engaging wheels and their supporting means.

The cutter shaft 41 is suspended in place by a driven clutch disk 43, opposed to the drive disk 15, and fixed on its upper end and bearing upon the upper end of the tubular standard 24. The driven disk 43 has downwardly bevelled teeth on its perimeter constituting a bevel gear in mesh with bevel pinions 44 on the radially inward ends of horizontal wheel driving shafts 45 which are journalled in the bearing halves 19 and 20 of the upper and lower support spiders 16 and 23, respectively, and in the horizontal portions 46 of wheel drive housings 47, which portions 46 extend through the casing 10 from globular portions 48, within which the outer ends of the shafts 45 have fixed bevel pinions 49 in mesh with bevel pinions 50 fixed on the upper ends of vertical jack shafts 51. The jack shafts 51 are journalled in vertical housing portions 52 depending from the globular portions 48 into lower vertical housing portions 53 on whose lower ends are laterally projecting portions 54 in which the stub axles 55 are journalled on which are mounted the ground engaging wheels 56, as shown in Figure 3, offset to one side. The lower housing portions 53 can turn relative to the upper housing portions 52.

The wheel stub axles 55 include wormwheels 57 with which are meshed worms 58 fixed on the lower ends of the jack shafts 51, whereby the wheels are driven to move the mower over the ground, with the motor 12 running, the drive clutch disk 15 is engaged with the driven clutch disk 43 so as to turn the wheel driving shafts 45 and the jack shafts 51.

The lower vertical portions 53 of the wheel drive housings 47 have pinions 59 fixed thereon which are constantly in mesh with the ring gear 32, whereby rotation of the ring gear 32 produces rotation of the wheels 56 about the vertical axes of the housing portions 53.

In order to overcome a steering moment on the wheels 56, one of the wheels, especially designated 56ª is arranged at the side of the stub axle housing portion 54 opposite that on which the other wheels are located, as indicated in Figures 1 and 2; and the corresponding housing portion 54 and stub axle 55 are slightly lengthened so as to put the wheel 56ª slightly farther from its vertical turning axis than the other wheels.

Mounted fixedly on one side of the casing 10 is a radially projected reclining L-shaped bracket 60, whose vertical portion 61 has an inwardly projecting arm 62 in which is supportably and vertically journalled an idler pinion 63 in mesh with the large ring gear 32 and having a bevel gear portion 64 in mesh with a bevel pinion 65 journalled horizontally in the lower extremity of said vertical bracket portion 61, in such arrangement that the bevel pinion 65 can be rotated in either direction to rotate the large ring gear 32, in corresponding directions, and thereby steer the wheels 56 and 56ª together to the desired positions determining the direction of travel of the mower over the ground.

The mower handle 66 is composed of two handle elements 67 and 68 positioned one above the other. The upper handle element 67 has its forward end pivoted on a horizontal axis in a clevis 69 on the outer side of the upper part of the vertical portion 61 of the bracket 60 and has two oppositely laterally extending levers 70 and 71 pivoted on its outer end. The lower handle element 68 is pivoted at its lower end in a clevis 72 operatively connected with the bevel pinion 65 and has a lateral hand grip 73 on its upper end, facilitating manual rotation of the lower handle element for steering the ground engaging wheels 56 and 56ª. The lower handle element is rotatively supported parallel below the upper handle element by means of a connecting bar 74, whereby the two handle elements swing together as a unit relative to the mower mechanism.

The clutch comprising the upper drive disk 15 and the lower driven disk 43 have suitable operating mechanism (not shown in detail) whereby the upper disk is normally retracted out of operative engagement with the lower disk. For engaging the disks to permit the motor 12 to drive the wheels 56 and 56ª there is provided a shifting fork 75, pivoted on one of the legs 18 of the upper support spider 16, and having an actuating lever 76 operatively connected to a protected flexible cable 77 leading out of the housing 10 and along the upper handle element 67 to connect with preferably the right hand lever 70. Similarly connected to the left hand lever 71 is a protected flexible cable 77ª leading along the upper handle element and through the casing to the engine throttle (not shown), whereby the speed of travel of the mower over the ground can be determined and controlled.

In the use of the mower, the operator may take a relatively stationary position and, holding the handgrip 73, permit the mower to travel in the arc of a circle thus cutting an arcuate swath and, then taking a position spaced from the first position and retaining his grip upon the handgrip, permit the mower to travel in the arc of a circle adjacent the first swath. Further, because the operator is not required to follow the mower's movements by riding thereon or by walking behind the mower, and thereby negotiating the full distance travelled by the mower, the mower of the present invention can be efficiently operated at greater speeds than present mowers, without endangering or unduly fatiguing the operator, and accomplish a greater amount of mowing in substantially less time.

Various changes may be made to the form of the invention herein shown and described without departing from the spirit of the invention or scope of the claims.

What I claim is:

1. A powered mower comprising a generally circular horizontal casing, a motor mounted therein, a supporting cage secured to said motor and depending therefrom, a wheel support mount secured to said cage, a plurality of circumferentially spaced wheel units mounted upon said mount, outwardly of the periphery of said casing, each wheel unit comprising a lower portion turnable on a vertical axis relative to upper portion thereof, a ground engaging wheel mounted on the lower portion of each unit, driving means operatively connected between each wheel and said motor for driving said wheels together to move the mower over the ground, and steering means operatively connected to said turnable lower portions to turn said wheels together in any direction for steering said mower in its movement over the ground including pinions on said lower portions and a ring gear meshing therewith, handle means extending from said frame for initially positioning and for guiding said mower in its movement over the ground, clutch means within said cage for operatively connecting and disconnecting said motor with said driving means, and a clutch operating lever on said handle connected to said clutch means for connecting and disconnecting said motor from said driving means.

2. A powered mower comprising a housing, a motor mounted therein, a support cage, a mounting for said support cage, depending from the housing of said motor said mounting having a cylindrical boss, a relatively large ring gear, with its periphery extending outwardly of the vertical plane of said housing and journalled on said boss and supported for rotation on said mounting, a rotatable vertical cutter shaft mounted through said boss and having a bladed cutting rotor secured to its lower end below said mounting and remote from said rotor, first gear means fixed on its upper end, a plurality of circumferentially spaced wheel units arranged around the periphery of said large ring gear and disposed outwardly of said plane, each unit provided with a wheel drive housing comprising upper and lower parts and having its upper part stationarily and supportably connected to said support cage and its lower part turnable on a vertical axis relative to said upper part, said lower part having second gear means in mesh with said large ring gear, and a ground engaging wheel, whereby said frame is supported in spaced relation to and for movement over the ground, wheel driving means extending through said wheel drive housings and operatively connecting said wheels with said first gear means on said cutter shaft whereby the wheels are rotated to move the mower over the ground while said cutter rotor is operated, a releasable operative connection means between said motor shaft and said cutter shaft, and manual means for rotating said large ring gear to turn said wheels on their vertical axes so as to steer the mower while the mower is moving over the ground.

3. A powered mower comprising a generally circular horizontal housing, a motor mounted therein, a plurality of circumferentially spaced wheel units mounted around and outwardly of the perimeter of said housing, each wheel unit comprising a lower portion turnable on a vertical axis relative to the upper portion thereof, a ground engaging wheel mounted on the lower portion of each unit, driving means operatively connected between each wheel and said motor for driving said wheels together to move the mower over the ground, and steering means operatively connected to said turnable lower portions whereby said wheels are turned together in any direction for steering said mower in its movement over the ground including a large ring gear extending outwardly of said housing and a pinion mounted upon each of said lower portions and meshing with said ring gear, said wheels units having laterally projecting stub axles on which the wheels are mounted at one side of the vertical turning axes of said wheels.

ROLAND E. GUNTHER.

REFERENCES CITED

The following references are of record in the file of this patent:

UNITED STATES PATENTS

| Number | Name | Date |
|---|---|---|
| 991,916 | Weinbeer | May 9, 1911 |
| 1,831,681 | Miller | Nov. 10, 1931 |